United States Patent
Staudigel et al.

(10) Patent No.: US 11,609,150 B2
(45) Date of Patent: Mar. 21, 2023

(54) TEST STAND AND METHOD FOR TESTING A BEARING

(71) Applicant: Schaeffler Technologies AG & Co. KG, Herzogenaurach (DE)

(72) Inventors: Andreas Staudigel, Schweinfurt (DE); Hermann Reichelt, Elfershausen (DE); Klaus Koenig, Mühlhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 116 days.

(21) Appl. No.: 17/311,434

(22) PCT Filed: Nov. 20, 2019

(86) PCT No.: PCT/DE2019/100994
§ 371 (c)(1),
(2) Date: Jun. 7, 2021

(87) PCT Pub. No.: WO2020/125849
PCT Pub. Date: Jun. 25, 2020

(65) Prior Publication Data
US 2022/0026309 A1    Jan. 27, 2022

(30) Foreign Application Priority Data

Dec. 18, 2018  (DE) ..................... 10 2018 132 582.7

(51) Int. Cl.
G01M 13/04    (2019.01)
(52) U.S. Cl.
CPC .................. G01M 13/04 (2013.01)

(58) Field of Classification Search
CPC ...................................................... G01M 13/04
See application file for complete search history.

(56) References Cited

U.S. PATENT DOCUMENTS

| 2,439,035 | A | * | 4/1948 | Bidwell | ................ | G01M 13/04 73/66 |
| 2,722,824 | A | * | 11/1955 | Jensen | .................. | G01M 13/04 73/9 |

(Continued)

FOREIGN PATENT DOCUMENTS

| DE | 19713998 | 5/1998 |
| DE | 202006001458 | 3/2006 |

(Continued)

*Primary Examiner* — Eric S. McCall

(57) ABSTRACT

A test stand for testing a bearing with a first bearing ring and a second bearing ring includes a rotatable drive flange for driving the first bearing ring, a holding bearing for supporting the bearing and for introducing a testing force into the bearing, and a drive motor. The holding bearing includes a first support ring arranged to be secured to the second bearing ring, a second support ring secured in a rotationally fixed manner, and an intermediate ring mounted between the first support ring and the second support ring in a relatively rotatable manner. The drive motor is coupled to the intermediate ring for rotating the intermediate ring relative to the first support ring and the second support ring. The bearing may be a wheel bearing of a motor vehicle. The first bearing ring may be an inner ring and the second bearing ring may be an outer ring.

18 Claims, 3 Drawing Sheets

(56) References Cited

U.S. PATENT DOCUMENTS

| | | | | |
|---|---|---|---|---|
| 2,872,805 A * | 2/1959 | Cochran, Jr. | ......... | G01M 13/04 73/807 |
| 2,928,275 A * | 3/1960 | Wadsworth | ........... | G01M 13/04 73/9 |
| 3,146,528 A * | 9/1964 | Goulet | .................... | F16C 19/00 33/573 |
| 3,324,708 A * | 6/1967 | Staph | ...................... | F16C 19/00 73/9 |
| 3,332,277 A * | 7/1967 | Blinder | ............... | G01M 13/045 73/593 |
| 5,072,611 A | 12/1991 | Budd et al. | | |
| 5,226,308 A * | 7/1993 | Gibson | ................ | G01M 13/04 73/9 |
| 2002/0083779 A1 * | 7/2002 | Narita | ................ | G01M 13/045 73/862.191 |
| 2010/0156652 A1 * | 6/2010 | Davis | .................... | G01M 13/04 340/682 |
| 2014/0298917 A1 * | 10/2014 | Nivet | ........................ | G01L 1/16 73/818 |
| 2016/0139000 A1 * | 5/2016 | Karasawa | ............. | G01M 13/04 73/865.9 |
| 2016/0282225 A1 * | 9/2016 | Teramoto | ............ | G01M 13/045 |
| 2018/0045607 A1 * | 2/2018 | Elmose | ................. | G01M 13/04 |
| 2018/0136081 A1 * | 5/2018 | Lee | ......................... | G01D 5/28 |
| 2018/0348090 A1 * | 12/2018 | Zhou | ................... | G01M 99/008 |
| 2021/0072115 A1 * | 3/2021 | McKinney | ............ | G01M 13/04 |
| 2022/0170820 A1 * | 6/2022 | Fujimaru | .............. | G01M 13/04 |
| 2022/0364953 A1 * | 11/2022 | Zhao | .................... | G01M 13/04 |

FOREIGN PATENT DOCUMENTS

| | | |
|---|---|---|
| DE | 102006008176 A1 | 8/2007 |
| DE | 102007040029 | 2/2009 |
| DE | 102008048131 | 4/2010 |
| DE | 102017122298 A1 | 3/2018 |
| DE | 102017101522 B4 | 7/2018 |
| JP | 1973064345 A | 12/1971 |
| JP | S56162034 | 12/1981 |
| JP | 2007205835 A | 8/2007 |
| JP | 2015137972 A | 7/2015 |
| JP | 2015175779 A | 10/2015 |
| JP | 2016151440 A | 8/2016 |

\* cited by examiner

TEST STAND AND METHOD FOR TESTING A BEARING

CROSS-REFERENCE TO RELATED APPLICATIONS

This application is the United States National Phase of PCT Appln. No. PCT/DE2019/100994 filed Nov. 20, 2019, which claims priority to German Application No. DE102018132582.7 filed Dec. 18, 2018, the entire disclosures of which are incorporated by reference herein.

TECHNICAL FIELD

The present disclosure relates to a test stand and to a method, with the aid of which a bearing can be tested; e.g., in the case of a wheel bearing of a motor vehicle, it should be possible to determine a friction occurring at a specific testing force.

BACKGROUND

DE 197 13 998 A1 discloses a test stand for determining a service life of wheel bearings of a motor vehicle, in which the wheel bearing to be tested is incorporated in a hydrostatic axial/radial slide bearing, via which a testing force can be introduced. By regulating a fluid flow to the hydrostatic axial/radial slide bearing, power loss of the hydrostatic axial/radial plain bearing can be minimized.

SUMMARY

According to the present disclosure, a test stand for testing a bearing, e.g., a wheel bearing of a motor vehicle, is provided with a rotatable drive flange for driving a first bearing ring, designed as an inner ring, for example, of the bearing to be tested, and a holding bearing for supporting the bearing to be tested and for introducing a testing force into the bearing to be tested. The holding bearing is designed as a three-ring bearing with a first support ring which can be secured to a second bearing ring, designed, for example, as an outer ring, of the bearing to be tested, said second bearing ring being rotatable relative to the first bearing ring. The holding bearing also has a second support ring, which is secured in a rotationally fixed manner, and an intermediate ring, which is mounted between the first support ring and the second support ring in a relatively rotatable manner. The intermediate ring is coupled to a drive motor for rotating the intermediate ring relative to the first support ring and the second support ring.

Compared to a hydrostatic or hydrodynamic slide bearing, the three-ring bearing is more cost-effective and more robust. Regulating an oil pressure between the first support ring and the second support ring can thereby be avoided and reduced. The intermediate ring, which can be rotated with the aid of the drive motor, can also minimize friction of the three-ring bearing that may falsify the measurement result. The drive motor can rotate the intermediate ring at an angular speed at which static friction between the intermediate ring and the support rings or intermediate rolling elements is overcome.

For example, the intermediate ring can be rotated at an angular speed at which the intermediate ring is operated in the transition area between mixed friction and fluid friction, e.g., in the vicinity of the release point which corresponds to the minimum of the Stribeck curve. A frictional torque impressed by the three-ring bearing can thereby be reduced to such a low level that an impairment of the measurement of a frictional force and/or a frictional torque of the bearing to be tested is not impaired at a certain testing force. The frictional force of the three-point bearing is so low that a measured force can be understood as a superposition of the frictional force of the three-point bearing and the frictional force of the bearing to be measured in a permissible manner. This means that any remaining frictional torque of the three-point bearing can be deducted retrospectively.

The knowledge that a frictional force of the intermediate ring faces in different tangential directions depending on the direction of rotation of the intermediate ring, while a frictional force of the bearing to be tested faces in the same tangential direction for a given direction of rotation of the drive flange, regardless of the current direction of rotation of the intermediate ring, is used here. If a force measurement takes place on the second bearing ring once in one rotational direction of the intermediate ring in a first circumferential direction and another time in a rotational direction of the intermediate ring in an opposite, second circumferential direction, the measured forces can be added so that the frictional forces of the intermediate ring cancel each other out, leaving only twice the frictional force of the bearing to be tested. The frictional force to be measured of the bearing to be tested results simply from the mean value of the two forces measured with different rotational directions of the intermediate ring. Due to the intermediate ring that can be rotated in different directions, it is easy to determine the friction of the bearing to be tested that occurs at a specific testing force with a simple and robust structure, so that cost-effective and simple testing of bearings is possible.

A suitable three-ring bearing is shown in DE 10 2007 040 029 A1, for example. The test stand can also be designed and developed as shown in DE 197 13 998 A1, the content of which is hereby incorporated by reference as if set for fully herein.

A force gauge, designed as a load cell, for example, may act on the second bearing ring substantially in a tangential direction with a force direction that is radially offset from a rotational axis of the drive flange. The force gauge can act on the second bearing ring directly or indirectly, e.g., via the first support ring and/or an intermediate piece or adapter piece connected to the first support ring. The force gauge can thus measure a frictional force of the bearing to be tested that occurs when the testing force is applied. A frictional force superimposed on this frictional force between the first support ring and the intermediate ring is also recorded by the force gauge as part of the measured force, and this frictional force is automatically eliminated during a further measurement, when the intermediate ring rotates in the opposite direction, and when both measured values are taken into account when calculating the frictional force of the bearing to be tested.

The force direction of the force gauge may be oriented substantially perpendicular to a testing force that can be introduced on the second support ring. An influence of the testing force on the measuring force measured by the force gauge can be thereby avoided.

The drive motor may be designed to rotate the intermediate ring in both circumferential directions. The drive motor is designed, for example, as a three-phase motor, in which the rotational direction can be achieved by interchanging two phases, for example with the aid of a reversing switch. The rotational direction of the intermediate ring can thus be changed by changing the rotational direction of the drive motor, so that it is not necessary to change the rotational direction in the coupling of the drive motor to the intermediate ring. A measurement with different rotational directions of the intermediate ring can thus be implemented easily and cost-effectively.

The second support ring may be fastened in a rotationally fixed manner to a test frame for introducing a testing force. The test frame may be designed for impressing a vertical testing force corresponding to a contact force, for example, and/or for applying a horizontal testing force corresponding to a longitudinal force, for example, and/or for impressing an axial testing force corresponding to a lateral force, for example. The test frame can be impinged with the desired testing force in the desired direction, for example with the aid of hydraulic pistons. The testing force can then act on the bearing to be tested via the second support ring, the intermediate ring and the first support ring, with the second support ring firmly attached to the test frame. This prevents the testing force from being applied to the drive flange, which could possibly lead to an additional imbalance.

The first support ring and the second support ring may be mounted on the intermediate ring via, e.g., identically shaped, rolling elements, e.g., spheres. The rolling elements can also minimize sliding friction contact in the holding bearing. The frictional force remaining in the three-ring bearing can thereby be further reduced.

The drive motor may be coupled to the intermediate ring via a belt, e.g., a flat belt or V-belt. As a result, a cost-effective and simple drive for the intermediate ring is realized. In addition, the belt can abut over a large area in the circumferential direction and/or in the axial direction on the intermediate ring, e.g., an integral or separately designed pipe section or belt pulley of the intermediate ring, so that the contact pressure acting on the intermediate ring can be distributed over a large area. An impairment of the force measurement when testing the bearing to be tested by the connection of the drive motor and the introduction of a torque into the intermediate ring can thereby be avoided or reduced to a negligible extent.

The first support ring may have an exchangeable adapter piece for attaching to the second bearing ring. This makes it possible to fasten bearings with different outer diameters and/or inner diameters to the second bearing ring by simply exchanging the adapter piece while the rest of the test stand remains largely unchanged. For this purpose, the second bearing ring can have a radially protruding fastening flange to which the respective adapter piece can be flanged. The drive flange may have an exchangeable adapter flange for attachment to the first bearing ring. As a result, it is similarly possible to fasten a bearing with different outer diameters and/or inner diameters to the drive flange by simply exchanging the adapter flange while the rest of the test stand remains largely unchanged.

The present disclosure relates to a method for testing a bearing, e.g., a wheel bearing of a motor vehicle, in which a bearing to be tested has a drive flange of a test stand that can be trained and further developed as described above, and is attached to the first support ring of the test stand. The drive flange is set in rotation, a testing force, e.g., introduced via the second support ring, is applied to the bearing to be tested, the intermediate ring is rotated in a first circumferential direction to overcome static friction with the first support ring and the second support ring, and a tangential first measuring force acting perpendicular to the direction of force of the testing force is measured during the rotation of the drive flange and during the rotation of the intermediate ring in the first circumferential direction. The intermediate ring is rotated in a second circumferential direction, opposite the first circumferential direction, to overcome static friction with the first support ring and the second support ring, and a tangential second measuring force acting perpendicular to the force direction of the testing force is measured during the rotation of the drive flange and during the rotation of the intermediate ring in the second circumferential direction. A frictional force of the bearing to be tested at the applied test force is calculated from the first measuring force and the second measuring force.

The frictional force of the intermediate ring faces in different tangential directions depending on the rotational direction of the intermediate ring, and the frictional force of the bearing to be tested faces in the same tangential direction for a given and unchanging rotational direction of the drive flange, regardless of the current rotational direction of the intermediate ring. As soon as a force measurement takes place on the second bearing ring once in one rotational direction of the intermediate ring in the first circumferential direction and another time in a rotational direction of the intermediate ring in the opposite, second circumferential direction, the measured forces can be added so that the frictional forces of the intermediate ring cancel each other out, leaving only twice the frictional force of the bearing to be tested.

The frictional force to be measured of the bearing to be tested is calculated simply from the mean value of the two measuring forces measured with different rotational directions of the intermediate ring. Due to the intermediate ring that can be rotated in different directions, it is easy to determine the friction of the bearing to be tested that occurs at a specific testing force with a simple and robust structure, so that cost-effective and simple testing of bearings is possible.

The bearing to be tested may be replaced by a further bearing to be tested with a different inside diameter and/or different outside diameter, and the second bearing ring of the further bearing to be tested is attached via an exchangeable adapter piece to the first support ring and/or the first bearing ring of the further bearing to be tested is attached to the drive flange via an exchangeable adapter flange. This makes it possible to test bearings with different outside diameters and/or inside diameters in the test stand. Only the adapter piece and/or the adapter flange is exchanged and the rest of the test stand remains largely unchanged.

BRIEF DESCRIPTION OF THE DRAWINGS

In the following, the present disclosure is explained by way of example with reference to the accompanying drawings using exemplary embodiments, in which the features shown below can represent an aspect of the disclosure both individually and in combination.

In the figures.

DETAILED DESCRIPTION

Figure 1:
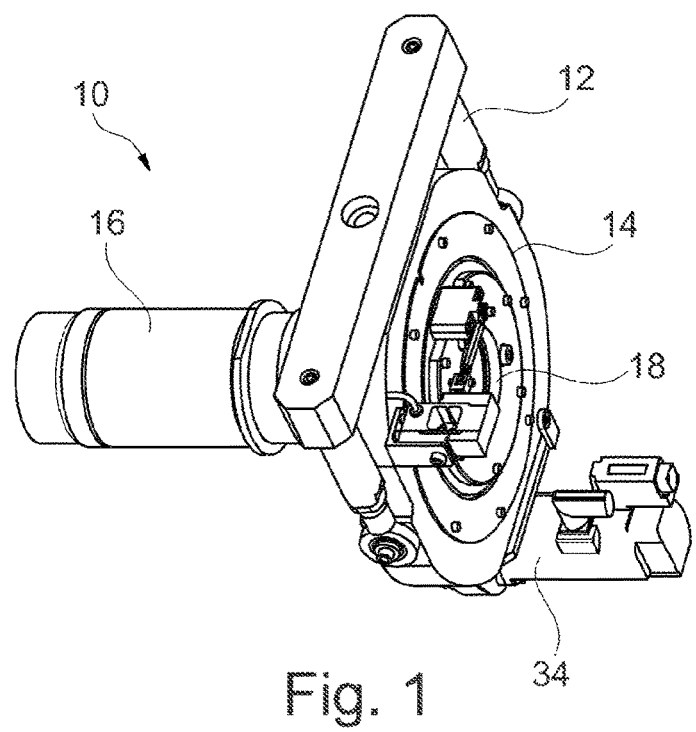
FIG. 1 shows a schematic perspective view of a test stand.

The test stand 10 shown in part in FIG. 1 has a test frame 12 movably received in a frame (not shown) into which a testing force can be introduced, for example with the aid of a hydraulic piston. The test frame 12 is firmly connected to a holding bearing 14 designed as a three-ring bearing, in which a bearing 18 to be tested, which can be set in rotation by an electric motor 16, is mounted. The bearing 18 is, for example, a wheel bearing of a wheel of a motor vehicle. The test frame can, for example, impress a testing force facing in the direction of gravity in order to simulate a contact force acting on the bearing 18, as can occur during ongoing operation of a motor vehicle.

Figure 2:
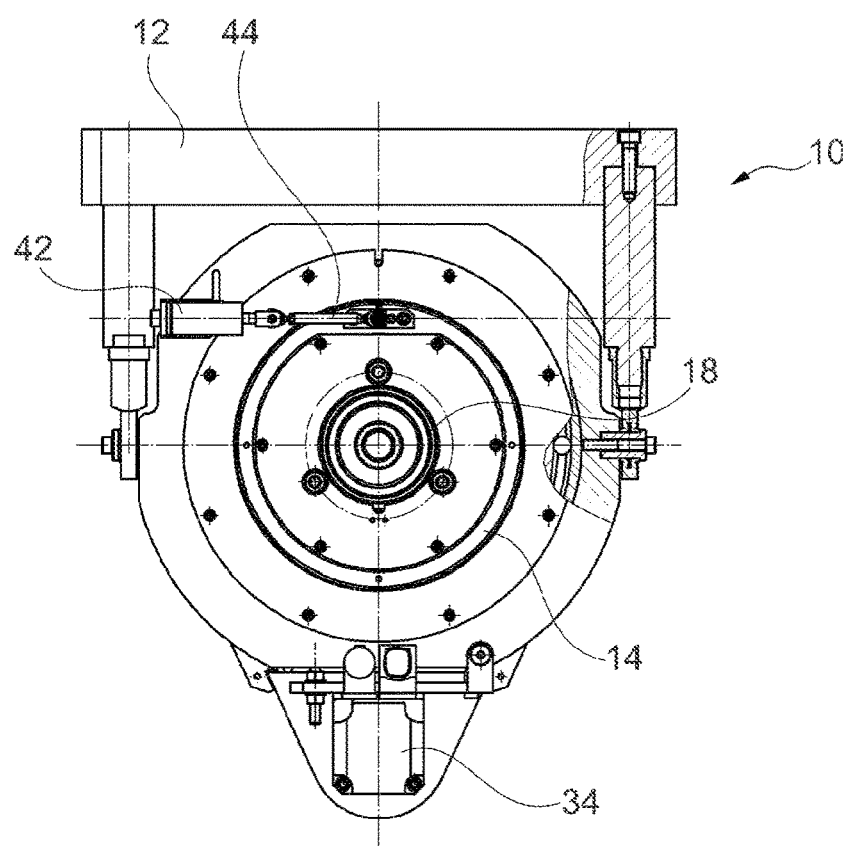
FIG. 2 shows a schematic plan view of the test stand from FIG. 1.
Figure 3:
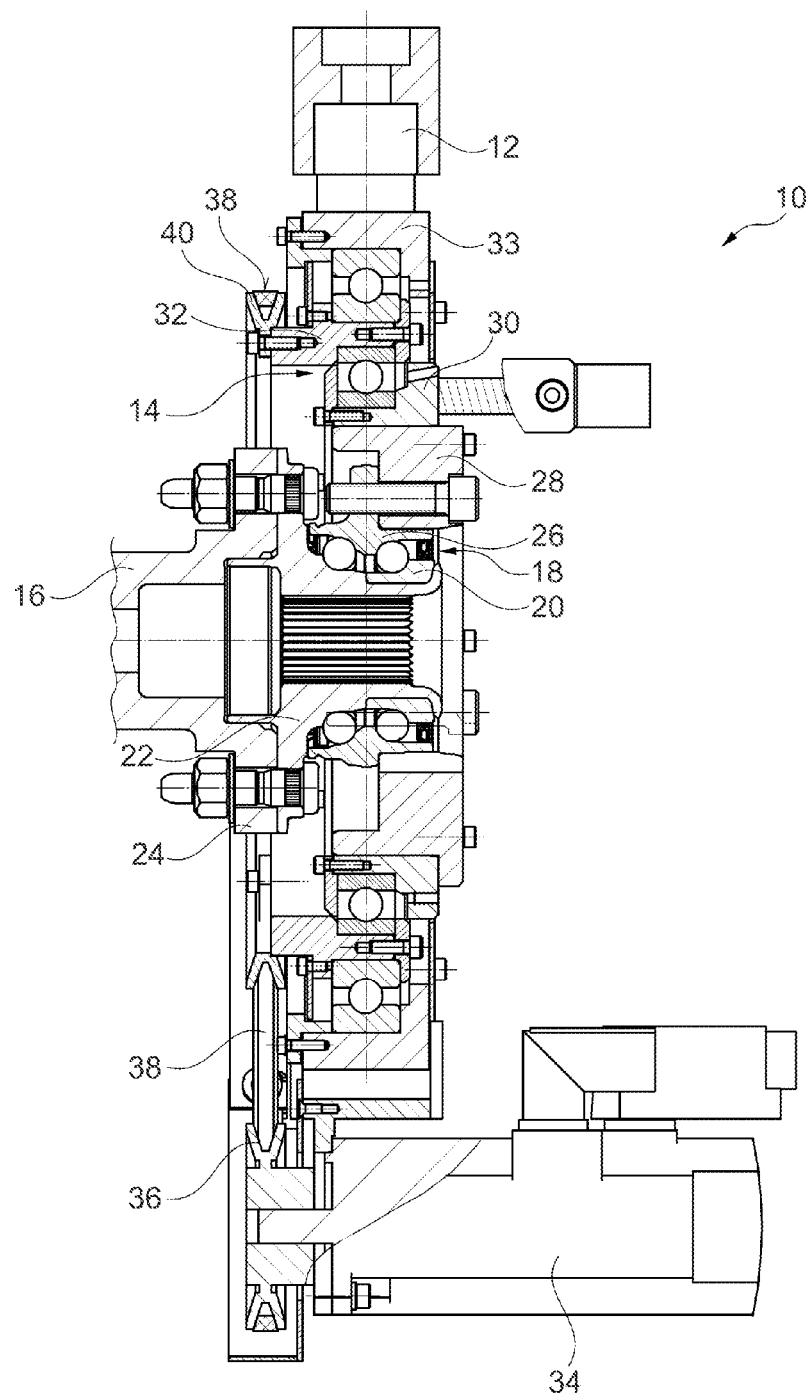
FIG. 3 shows a schematic sectional view of the test stand from FIG. 1.

As shown in FIG. 2 and FIG. 3, the bearing 18 has a first bearing ring 20 designed as an inner ring, which is connected via an exchangeable adapter flange 22 to a drive flange 24 of the electric motor 16 so that the electric motor 16 can set the first bearing ring 20 in rotation for measuring dynamic loads. The bearing 18 also has a second bearing ring 26 designed as an outer ring, which is mounted on the first bearing ring 20 via spheres, for example. The second bearing ring 26 is firmly connected via an adapter piece 28 to a first support ring 30 of the holding bearing 14 designed as a three-ring bearing. The first support ring 30 is supported by means of rolling elements on an intermediate ring 32, which is likewise supported by means of rolling elements on a second support ring 33 forming an outer ring. The second support ring 33 is connected to the test frame 12 in a rotationally fixed manner.

Figure 4:
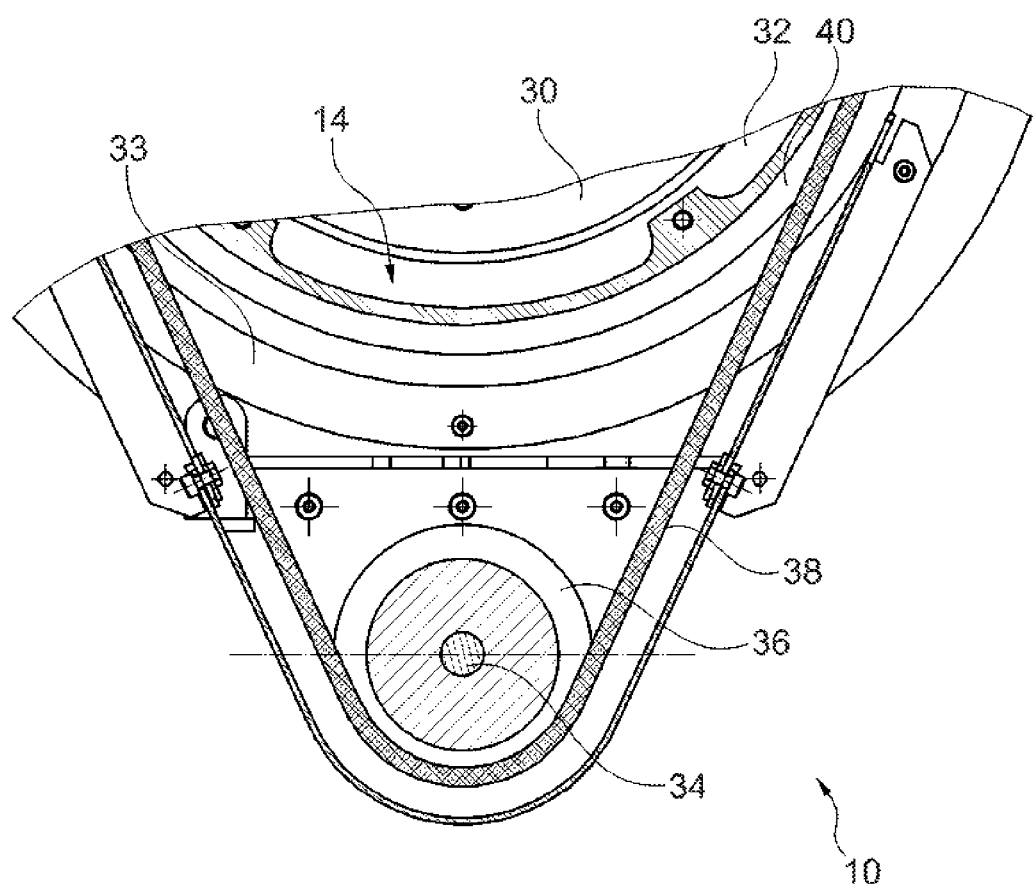
FIG. 4 shows a schematic sectional plan view of a detail of the test stand from FIG. 1.

So that the frictional forces of the holding bearing 14 do not impair the testing of the bearing 18, the intermediate ring 32 can be set in rotation by a drive motor 34, so that at least no static friction acts on the intermediate ring 32. The intermediate ring 32 may be rotated at a speed at which the friction on the intermediate ring 32 achieves the minimum of the Stribeck curve at the release point. To drive the intermediate ring 32, the drive motor 34 is coupled via a pinion 36, designed as a belt pulley, and an engaging belt 38, configured as a V-belt, for example, to an output pulley 40 firmly attached to the intermediate ring 32 and designed as a belt pulley, as also shown in FIG. 4.

A force gauge 42 designed as a load cell is connected to the intermediate ring 32 via a lever arm, spaced apart from a rotational axis of the bearing 18, via a coupling rod 44 and aligned in the tangential direction. The force gauge 42 can measure a force that is composed of the frictional force of the bearing 18 under the applied testing force and the remaining frictional force of the intermediate ring 32. When the intermediate ring 32, driven by the drive motor 34, and the first bearing ring 20, driven by the electric motor 16, rotate in the same circumferential direction, the frictional forces of the intermediate ring 32 and the bearing 18 measured by the force gauge 42 add up. When the intermediate ring 32 driven by the drive motor 34 and the first bearing ring 20 driven by the electric motor 16 rotate in a different circumferential direction, the frictional forces of the intermediate ring 32 and the bearing 18 are directed in a different tangential direction, so that the force gauge 42 measures the difference of the frictional forces. The frictional force of the bearing 18 can thus be calculated simply as the mean value of the measured values measured by the force gauge 42, since the frictional forces of the holding bearing 14, which are not known in terms of height, cancel each other out.

REFERENCE NUMERALS

10 Test stand
12 Test frame
14 Holding bearing
16 Electric motor
18 Bearing
20 First bearing ring
22 Adapter flange
24 Drive flange
26 Second bearing ring
28 Adapter piece
30 First support ring
32 Intermediate ring
33 Second support ring
34 Drive motor
36 Pinion
38 Belt
40 Output pulley
42 Force gauge
44 Coupling rod

The invention claimed is:

1. A test stand for testing a bearing having a first bearing ring rotatable relative to a second bearing ring, the test stand comprising:
   a rotatable drive flange for driving the first bearing ring;
   a holding bearing for supporting the bearing and for introducing a testing force into the bearing, the holding bearing comprising:
      a first support ring arranged to be secured to the second bearing ring;
      a second support ring secured in a rotationally fixed manner; and
      an intermediate ring mounted between the first support ring and the second support ring in a relatively rotatable manner; and
   a drive motor coupled to the intermediate ring for rotating the intermediate ring relative to the first support ring and the second support ring.

2. The test stand of claim 1 wherein the bearing is a wheel bearing of a motor vehicle.

3. The test stand of claim 1 wherein:
   the first bearing ring is an inner ring; and
   the second bearing ring is an outer ring.

4. The test stand of claim 1, wherein the drive motor is arranged to rotate the intermediate ring in a first circumferential direction and a second circumferential direction, opposite the first circumferential direction.

5. The test stand of claim 1, wherein the first support ring comprises an exchangeable adapter piece for attaching to the second bearing ring.

6. The test stand of claim 1 further comprising a test frame, wherein:
   the second support ring is fastened to the test frame in a rotationally fixed manner; and
   the test frame is arranged to apply a vertical testing force, a horizontal testing force, or an axial testing force.

7. The test stand of claim 6, wherein:
   the vertical testing force corresponds to a contact force;
   the horizontal testing force corresponds to a longitudinal force; and
   the axial testing force corresponds to a lateral force.

8. The test stand of claim 1, wherein the first support ring and the second support ring are mounted on the intermediate ring via rolling elements.

9. The test stand of claim 8 wherein the rolling elements are identically shaped spheres.

10. The test stand of claim 1 further comprising a belt coupling the drive motor to the intermediate ring.

11. The test stand of claim 10, wherein the belt is a flat belt or a V-belt.

12. The test stand of claim 1 further comprising a force gauge, wherein:
   the rotatable drive flange comprises a rotational axis; and the force gauge acts on the second bearing ring in a substantially tangential direction with a force direction that is radially offset from the rotational axis.

13. The test stand of claim 12 wherein the force gauge is a load cell.

14. The test stand of claim 12, wherein:
the testing force is introduced in a testing force direction; and
the force direction is oriented substantially perpendicular to the testing force direction.

15. A method for testing a bearing, comprising:
providing the bearing and the test stand of claim 14;
fastening the bearing to the drive flange and the first support ring;
rotating the drive flange;
applying the testing force to the bearing;
rotating the intermediate ring in a first circumferential direction to overcome static friction with the first support ring and the second support ring;
measuring a tangential first measuring force acting perpendicular to a testing force direction of the testing force during the rotating the drive flange and the rotating the intermediate ring;
rotating the intermediate ring in a second circumferential direction, opposite the first circumferential direction to overcome static friction with the first support ring and the second support ring;
measuring a tangential second measuring force acting perpendicular to a testing force direction of the testing force during the rotating the drive flange and the rotating the intermediate ring; and
calculating a frictional force of the bearing at the testing force from the tangential first measuring force and the tangential second measuring force.

16. The method of claim 15 wherein the bearing is a wheel bearing of a motor vehicle.

17. The method of claim 15 wherein the testing force is introduced via the second support ring.

18. The method of claim 15, further comprising:
providing a further bearing with different inside diameter or a different outside diameter than the bearing, the further bearing comprising a further first bearing ring and a further second bearing ring;
providing an exchangeable adapter flange or an exchangeable adapter piece;
replacing the bearing with the further bearing; and
attaching the further first bearing ring to the drive flange via the exchangeable adapter flange; or
attaching the further second bearing ring to the first support ring via the exchangeable adapter piece.

* * * * *